(12) United States Patent
Sheen et al.

(10) Patent No.: US 7,965,985 B2
(45) Date of Patent: Jun. 21, 2011

(54) WIRELESS COMMUNICATION SYSTEMS, METHODS, AND DATA STRUCTURE

(75) Inventors: Wen-Ho Sheen, Minsyong Township (TW); Fang-Ching Ren, Hsinchu (TW); Tzu-Ming Lin, Jhubei (TW); Chie-Ming Chou, Cingshuei Township (TW)

(73) Assignee: Industrial Technology Research Institute, Hsinchu (TW)

( * ) Notice: Subject to any disclaimer, the term of this patent is extended or adjusted under 35 U.S.C. 154(b) by 682 days.

(21) Appl. No.: 11/864,739

(22) Filed: Sep. 28, 2007

(65) Prior Publication Data

US 2008/0085677 A1  Apr. 10, 2008

Related U.S. Application Data

(60) Provisional application No. 60/828,132, filed on Oct. 4, 2006.

(51) Int. Cl.
*H04B 1/00* (2006.01)

(52) U.S. Cl. ...... 455/63.2; 455/63.1; 455/509; 455/447; 370/315

(58) Field of Classification Search ................ 455/63.2, 455/63.1, 509, 447, 446, 113; 370/315, 329, 370/410, 311, 331
See application file for complete search history.

(56) References Cited

U.S. PATENT DOCUMENTS

| | | | | |
|---|---|---|---|---|
| 7,369,853 B2 * | 5/2008 | Son et al. | | 455/436 |
| 7,515,559 B2 * | 4/2009 | Koo et al. | | 370/328 |
| 2005/0018661 A1 * | 1/2005 | Kelley | | 370/352 |
| 2005/0232183 A1 * | 10/2005 | Sartori et al. | | 370/319 |
| 2006/0029075 A1 * | 2/2006 | Sheppard et al. | | 370/392 |
| 2006/0153227 A1 * | 7/2006 | Hwang et al. | | 370/465 |
| 2006/0209734 A1 * | 9/2006 | Son et al. | | 370/312 |
| 2006/0239264 A1 * | 10/2006 | Kang et al. | | 370/390 |
| 2007/0173198 A1 * | 7/2007 | Kim et al. | | 455/63.1 |
| 2007/0191015 A1 * | 8/2007 | Hwang et al. | | 455/442 |
| 2007/0218847 A1 * | 9/2007 | Cho et al. | | 455/102 |
| 2007/0275746 A1 * | 11/2007 | Bitran | | 455/509 |
| 2007/0280188 A1 * | 12/2007 | Kang et al. | | 370/338 |
| 2008/0084892 A1 * | 4/2008 | Sheen et al. | | 370/410 |
| 2008/0101275 A1 * | 5/2008 | Kang et al. | | 370/315 |
| 2008/0181160 A1 * | 7/2008 | Dillon | | 370/312 |
| 2008/0186950 A1 * | 8/2008 | Zhu et al. | | 370/350 |
| 2008/0205365 A1 * | 8/2008 | Russell et al. | | 370/341 |

(Continued)

FOREIGN PATENT DOCUMENTS

KR   10-2003-0093592   12/2003

OTHER PUBLICATIONS

Office Action Summary mailed Dec. 1, 2009, for Korean Patent Application No. 10-2007-0099865.

*Primary Examiner* — Minh D Dao
(74) *Attorney, Agent, or Firm* — Finnegan, Henderson, Farabow, Garrett & Dunner, LLP (57) ABSTRACT

A wireless communication device is disclosed. The wireless communication device may include a first station and a second station. The first station is coupled with the second station. The first and second stations are within a first cluster. The stations within the first cluster are configured to operate cooperatively to transmit or receive signals corresponding to the cluster over at least one channel. One of the stations transmits only data signals without transmitting a preamble or a MAP message.

8 Claims, 7 Drawing Sheets

U.S. PATENT DOCUMENTS

| | | | |
|---|---|---|---|
| 2008/0220790 A1* | 9/2008 | Cai et al. | 455/450 |
| 2009/0010198 A1* | 1/2009 | Boariu et al. | 370/315 |
| 2009/0031045 A1* | 1/2009 | Maekawa et al. | 709/249 |
| 2009/0086670 A1* | 4/2009 | Hart et al. | 370/329 |
| 2009/0103465 A1* | 4/2009 | Chow et al. | 370/312 |
| 2009/0103561 A1* | 4/2009 | Qi et al. | 370/468 |
| 2009/0135755 A1* | 5/2009 | Qi et al. | 370/311 |
| 2009/0154386 A1* | 6/2009 | So et al. | 370/311 |
| 2009/0252079 A1* | 10/2009 | Zhang et al. | 370/315 |
| 2010/0014462 A1* | 1/2010 | Son et al. | 370/328 |
| 2010/0054137 A1* | 3/2010 | Deng et al. | 370/247 |
| 2010/0061339 A1* | 3/2010 | Kim et al. | 370/331 |

\* cited by examiner

WIRELESS COMMUNICATION SYSTEMS, METHODS, AND DATA STRUCTURE

RELATED APPLICATIONS

This application is related to an application entitled "WIRELESS COMMUNICATION SYSTEMS, METHODS, AND DATA STRUCTURE", which is filed concurrently herewith and hereby is incorporated by reference in its entirety. This application claims priority to U.S. Provisional Application No. 60/828,132, filed Oct. 4, 2006, which is hereby incorporated by reference in its entirety.

FIELD OF INVENTION

The application relates to wireless communication systems and methods for providing wireless communication, more particularly, to wireless communication systems, methods and related data structure.

BACKGROUND

Communication systems, such as wireless communication systems, provide one or more communication networks that allow user terminals or mobile stations (users) to move within the network without losing the ability to continue or have communication with the network. To provide a network, a wireless communication relies on stations to transmit signals to users. However, each station has limited coverage due to the limitation on signal strength and the fact the signal strength degrades over distance. As the distance between users and stations increases, the strength of the signal received becomes lower and the transmission quality becomes lower. Additionally, signal quality and coverage may be affected by factors such as physical structures, signal interference, weather, transmission conditions, formats, etc. Therefore, coverage gaps or "holes" may exist and users in those areas may have limited or no network access.

One solution to avoid or reduce coverage holes is to provide more base stations to enhance the communication coverage and system capacity. However, system cost increases as the number of stations increases. As an alternative solution, a communication network may rely on relay stations, such as those implementing the concept of multi-hop relaying (MR). However, in some applications, the use of relaying stations may increase the need for station-to-station handovers and may require increased process overhead for handovers due to limited coverage areas of each relay station. In some applications, it also may reduce the spectrum efficiency because multiple transmissions are needed for multi-hop relays.

SUMMARY OF INVENTION

Examples consistent with the present invention may provide methods for providing wireless communication through clustering of stations.

One example provides a first station. The first station is coupled with a second station. The first and second stations are within a first cluster. The stations within the first cluster are configured to operate cooperatively to transmit or receive signals corresponding to the cluster over at least one channel. One of the stations transmits only data signals without transmitting a preamble or a MAP message.

BRIEF DESCRIPTION OF THE SEVERAL VIEWS OF THE DRAWINGS

The foregoing summary, as well as the following detailed description of the invention, will be better understood when read in conjunction with the appended drawings.

In the drawings.

DETAILED DESCRIPTION OF THE INVENTION

Examples of the invention may provide a method applicable to wireless communications and data structures applicable to wireless communications. In some examples, a method may include classifying stations, such as control stations, base stations, relay stations or mobile stations, into different clusters and groups. With clustering and grouping, the frequency spectrum may be used or reused to increase the bandwidth efficiency. Also the number of station-to-station handovers may be reduced. In some examples, cooperative transmission services or mechanisms may be used for stations in the same cluster. In some applications, examples of the invention may enhance network coverage and/or improve data throughput of a wireless network. Specifically, examples of the invention may provide one or more advantages in certain applications, such as increasing the utilization of radio resources, reducing the significant overhead needed by frequent handover processes, allowing frequency or channel reuse and supporting cooperative transmission services. As a result, a communication network with improved system capacity may be provided. In particular, methods or data structures illustrated below may be implemented in systems supporting multi-hop relaying ("MR") techniques.

A conventional channel grouping system or method may group terminals or nodes based on radio signal strength, as this may allow each node in a group to receive same or similar quality or strength of signals and provide same or similar quality of service. Examples of the present invention may divide stations into groups so that the stations in the same group can avoid or reduce interference among those stations. Also stations may be divided into clusters so that the stations in the same cluster may provide cooperative transmission services. In some examples, flexibilities may be provided to enable broad and flexible grouping and clustering, so that adjustments may be made to achieve one or more of various goals, such as system capacity and diversity in signals.

Some communication systems use techniques involving multiple antennas and certain pre-coding or coding techniques. Such systems may transmit various signals between groups of nodes or stations at the same time. Within a group, user terminals or mobile stations (users) may recognize the desired signals from the mixed or hybrid signals with co-channel interference and repeat the radio signal using a beam-forming technology by coordinating the transmission of the nodes in the same group. Examples of the invention may enable signal relay by redesigning the data structure and transmitting relayed signals in different frequency and time by scheduling techniques. In other words, relaying signals through multiple antennas may be avoided. Clustering in some examples may also extend service coverage and decrease the number of handovers.

Some other communication systems use path selection techniques. Each path may include one relay link between a base station and a relay station and one radio access link between a relay station and a user. By using steps such as tracking, forwarding, deciding and executing, one or more transmission paths available for transmitting signals from a base station to a user may be selected and an active set may be provided to provide information of the available paths for users. The information may be updated over time and several paths may be available at the same time to transmit the same data by cooperative transmission.

In examples of the present invention, stations belonging to the same cluster may operate cooperatively, such as by transmitting and receiving the same set of signals or data simultaneously. Additionally, stations belonging to the same group may reuse channels, which are usually provided within a frequency spectrum, to operate independently. In addition, a multi-hop relay data structure may be designed based on the concept of clustering and grouping to support radio resources allocation, and in some cases, to support data transmission for multi-hop relay services. In one example, some stations in the cluster may transmit only data signals without transmitting a preamble or a MAP message.

As an example, stations such as relay stations may be used by a wireless communication system to enhance the service coverage and/or increase the user throughput. In one example, an IEEE 802.16e system may be used to illustrate methods of applying clustering and grouping to a wireless communication system, such as an MR-enabled system. Such a system may be backward compatible with IEEE 802.16 systems or may be compatible with other systems to support radio resource allocations and data transmission.

Figure 1:
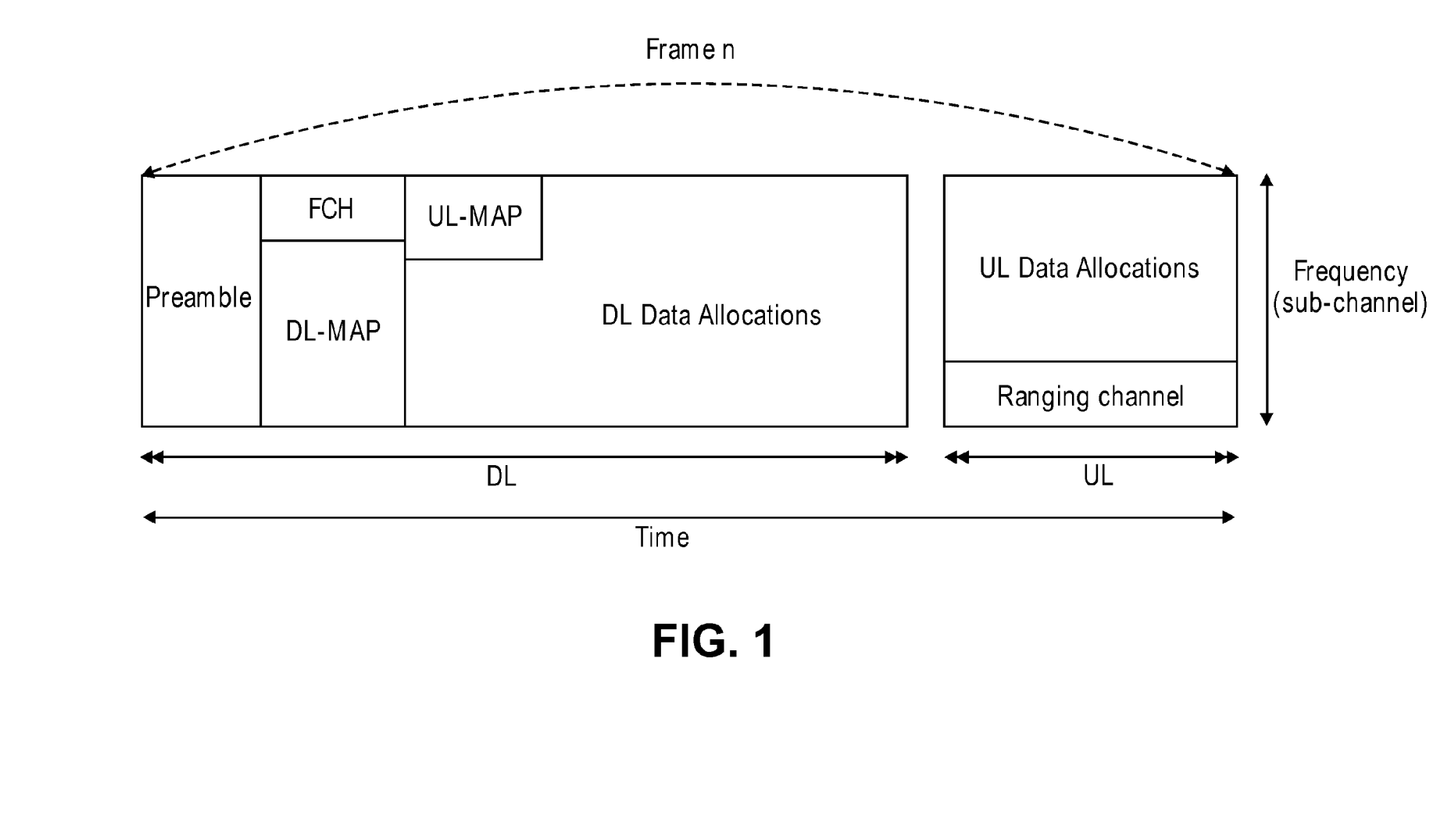
FIG. 1 is an exemplary data structure in the prior art.

FIG. 1 illustrates an example of the data structure under an IEEE 802.16e PMP (point-to-multipoint) mode. A base station, used intermittently as a control station for associated relay stations, may transmit the preamble first to provide a reference for a subscribe station (SS) synchronization, which may include adjusting the timing offset, frequency offset, and/or power. In one example, a subscribe station is a station that follows the indication of a base station to transmit and receive data. Next to the preamble, information such as an FCH (Frame Control Header), a DL-MAP (downlink MAP) message, and/or a UL-MAP (uplink-MAP) message may be transmitted to provide certain information of a transmitted frame. In one example, The DL-MAP message and UL-MAP message may indicate the resource allocation of the frame. After the subscribe station decodes these messages, time slot and frequency assignments may be determined or allocated for receiving and/or transmitting data.

In one example of an MR system, relay stations may play two roles of base stations and subscribe stations. A base station may support downlink synchronization with relay stations and subscribe stations that are directly coupled with the base station and provide DL-MAP message and UL-MAP message to indicate resource allocation for relay stations and subscribe stations. In this case, relay stations may work in the same way as subscribe stations. On the other hand, a subscribe station that is coupled to a relay station may get the synchronization and allocation information from the relay station without going through the base station. In this example, the relay station may work like or as a base station. Therefore, in some examples of an MR-enabled system, the data structure may include a base-station preamble, base-station MAP message, relay-station preamble, and relay-station MAP message to be compatible with IEEE 802.16e and support MR techniques.

Figure 2:
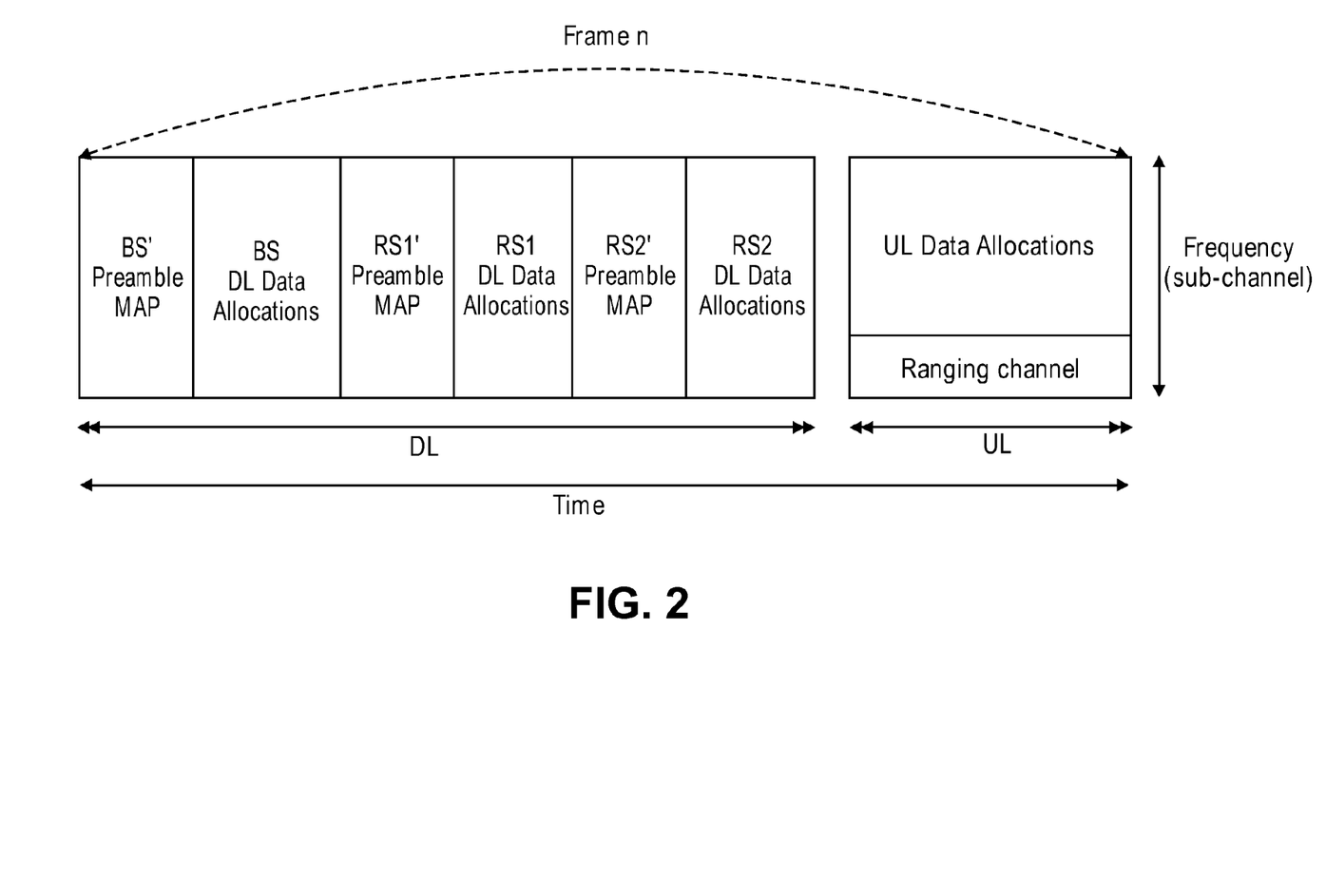
FIG. 2 is an exemplary data structure for MR-enabled mode without applying a clustering process.

A simple way to achieve backward compatibility is to conduct time division in the data structure. FIG. 2 illustrates an example of a data structure where time division is applied to a communication network with one base station (BS) and two relay stations (RSs). A simple time division implementation may allow the base station and the two relay stations (RS1 and RS2) to transmit their own data, such as packets and control overhead, at different times. However, as the number of relay stations increases, the overhead needed for the preamble and MAP message also increases. Additionally, if the users of the communication network move frequently, such as among various relay stations, handovers may occur frequently to synchronize each user with different relay stations, which may include PHY (physical) level adjustments. This technique may reduce the system performance of an MR-enabled system.

Figure 3A:
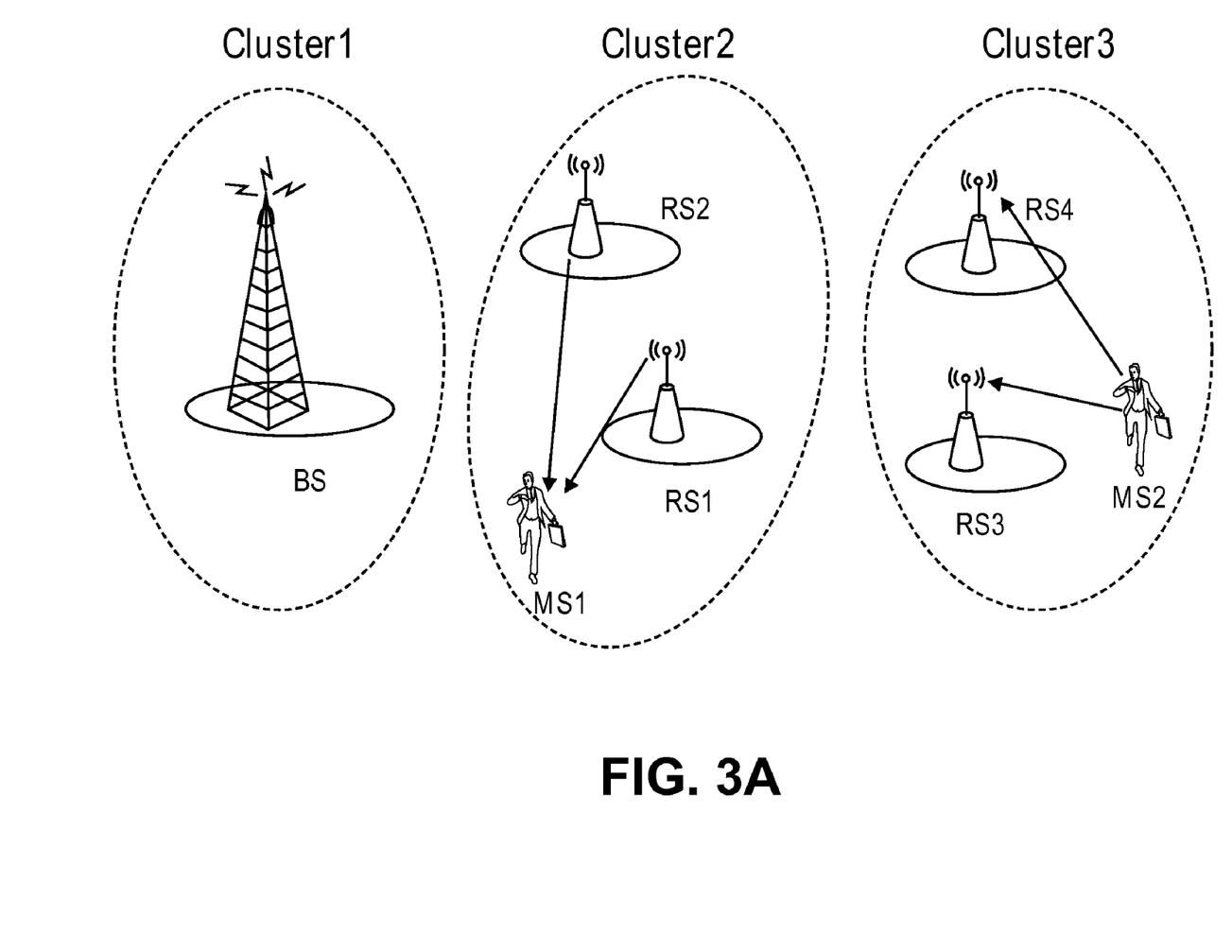
FIG. 3A is an exemplary clustering process.

Examples of the invention may apply a clustering process and may provide a different data structure. FIG. 3a illustrates an example of a clustering process where a MR base station itself may be placed in one cluster, cluster 1, and relay stations may be divided into two or more clusters, such as cluster 2 (with RS1 and RS2) and cluster 3 (with RS3 and RS4) as illustrated. Cluster 1, cluster 2 and cluster 3 may be considered as a virtual group. With a MR base station included in the virtual group, relay stations function as transparent stations to mobile stations. All the relay stations within the same group either transmit the same set of signal information as that of the MR base station or may not transmit any signal information. The signal information may include the preamble, FCH and MAP message. The radio resources therefore may be shared by the base station and all the relay stations within the same group for data burst transmission. A cooperative service also allows the stations in the same cluster simultaneously to transmit and/or receive the same set of signal information. For users in this cluster, stations, such as one or more of base stations and relay stations, in the same cluster may provide the same preamble to provide users with synchronized signals in a multi-path manner. In other words, users may see signals coming from two or more stations as a combined signal coming from a station through multi-path transmission. Therefore, for stations in the same cluster, they may share the allocated radio resources and schedule the data transmission accordingly, such as in a sequential order. As a result, in one example, only one MAP message in a cluster is transmitted from all stations to indicate the scheduling for data transmission.

Figure 3B:
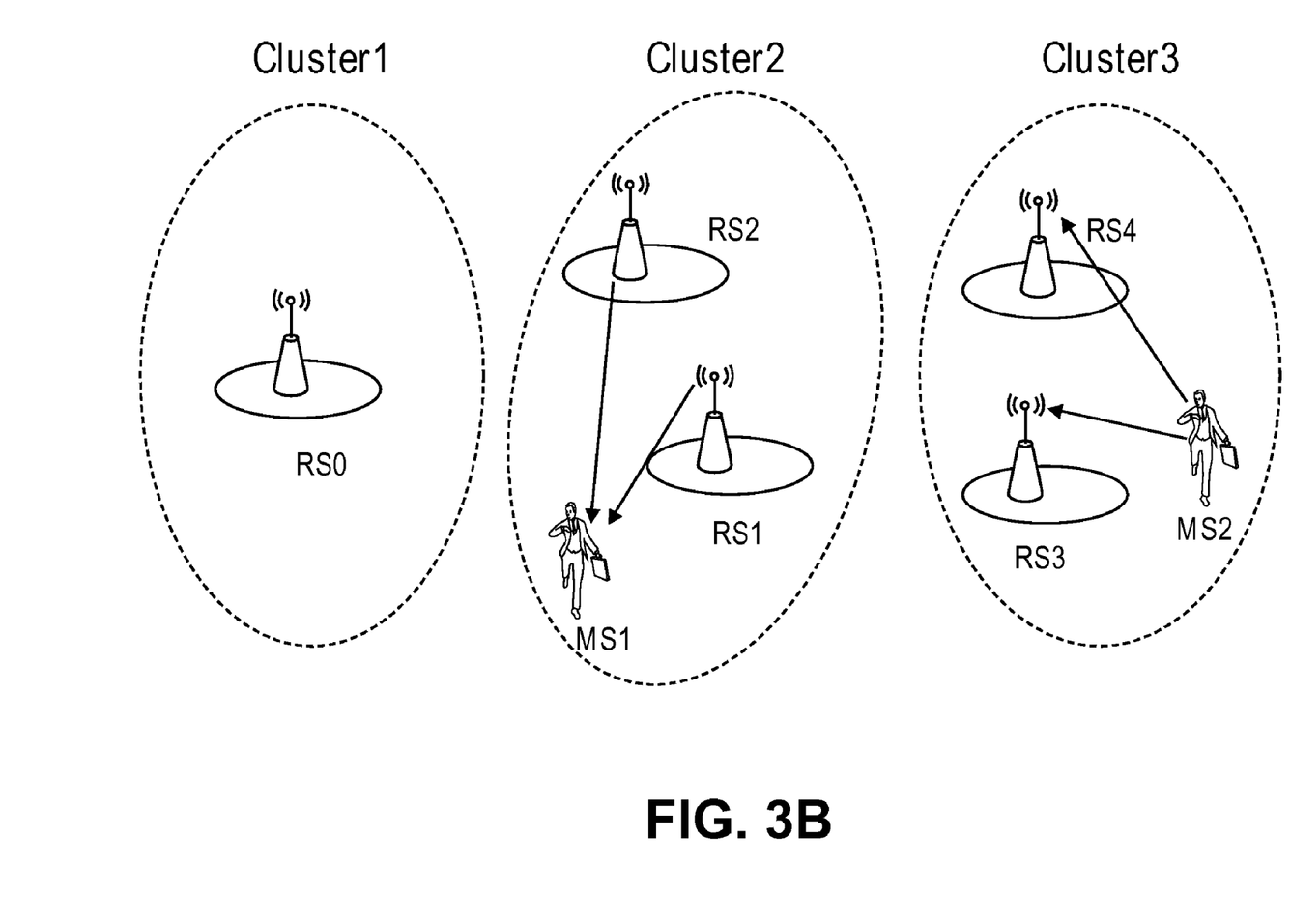
FIG. 3B is another exemplary clustering process.

FIG. 3b illustrates an example of a clustering process applied to a plurality of relay stations in a group where no base station is included in the group. In the absence of a MR base station, one of the relay stations may become a group header of the group and may be non-transparent to mobile stations. As shown in FIG. 3b, one relay station, e.g. RS0 as a group header acting as a base station is placed in cluster 1. In this embodiment, RS0 is non-transparent to mobile stations. Other relay stations may be divided into two or more clusters, e.g. cluster 2 (with RS1 and RS2) and cluster 3 (with RS3 and RS4). Cluster 1, cluster 2 and cluster 3 are considered as a group without MR base station. All the relay stations within the same group may either transmit the same set of signal information as that of the non-transparent group header or may not transmit any signal information. The signal information may include the preamble, FCH and MAP message. The radio resources therefore may be shared by all the relay stations within the same group for data burst transmission. The group header may transmit the preamble, FCH and MAP message to mobile station and may be recognized as an ordinary base station by a mobile station. Using this clustering process, the group is transparent to its mobile station (s).

FIGS. 3a and 3b also describe a wireless communication system. For various example embodiments, in one cluster (e.g. cluster 2), a station (e.g. RS1) is coupled with another station (e.g. RS2). In one embodiment, the stations (e.g. R1 and R2) in the same cluster (e.g. cluster 2) may be configured to operate cooperatively to transmit and/or receive signals corresponding to cluster 2. For example, the stations in the same cluster may simultaneously transmit and/or receive one set of signal information containing the same preamble and/or the same MAP message. Therefore, one or more of the stations may transmit only data signals without transmitting the preamble or the MAP message. As a result, stations in the same cluster may share the allocated radio resources.

Figure 4:
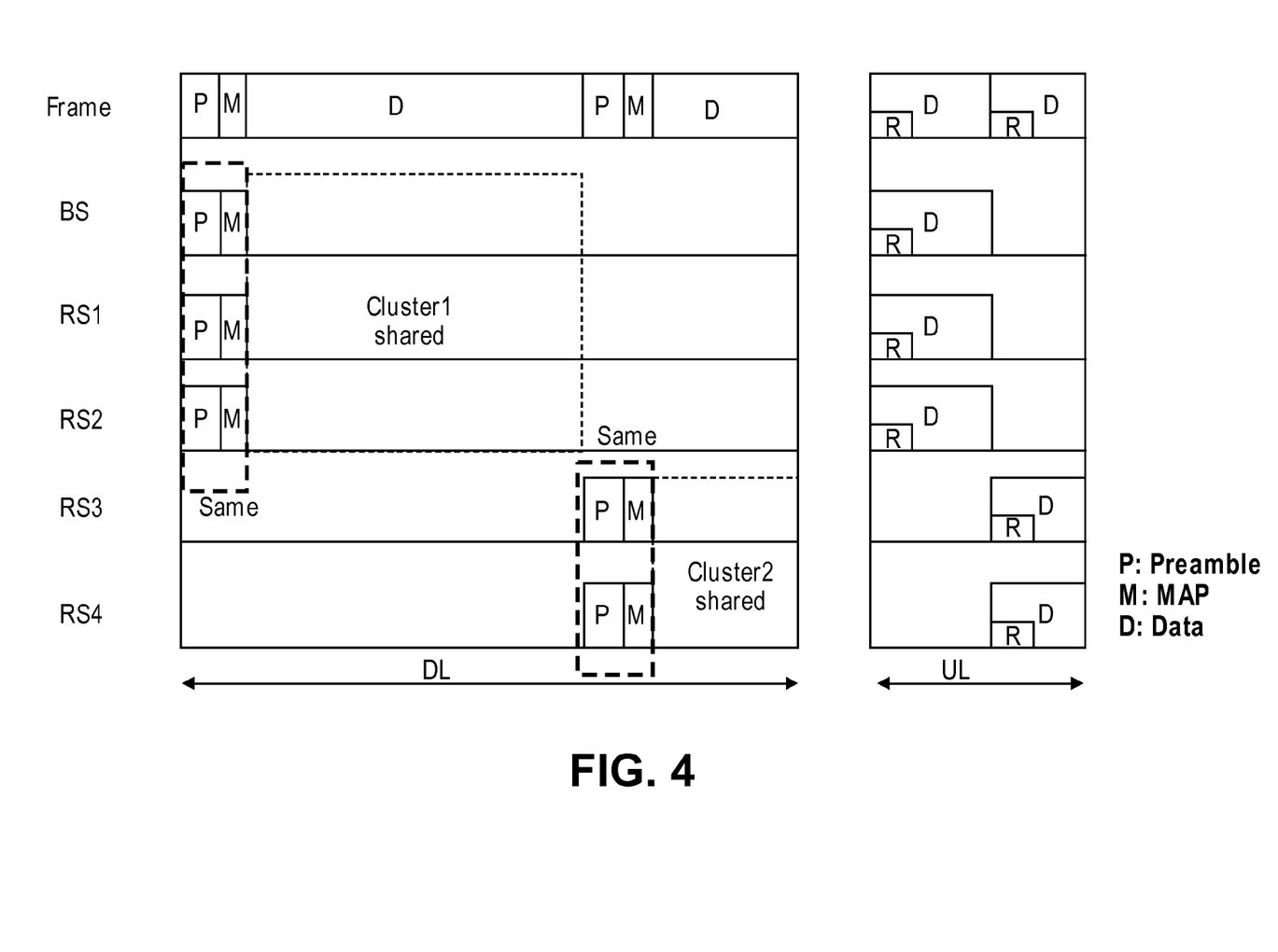
FIG. 4 is an exemplary data structure for MR-enabled mode with exemplary clustering implemented.

FIG. 4 illustrates a data structure according to one example of the invention. Referring to FIG. 4, all stations in the same cluster (Cluster 1) may transmit the same preamble and MAP message at the same time. This may avoid the need to transfer multiple control signals, such as in FIG. 2. Compared to FIG. 2, the data structure in FIG. 4 may improve the utilization of radio resources available for transmitting signals. In some examples, using the same preamble may also avoid the need for users or stations to perform handover processes frequently. In FIG. 4, R may represent a ranging channel in which a subscribe station can transmit a request to a base station in a content-based manner in one example. In some examples of the invention, a base station and associated relay station or stations may be placed in a single cluster of a wireless communication system, such as an MR-enabled system. This may reduce the amount of control signals or control signal overhead needed, thereby providing effective utilization of radio resources.

Figure 5:
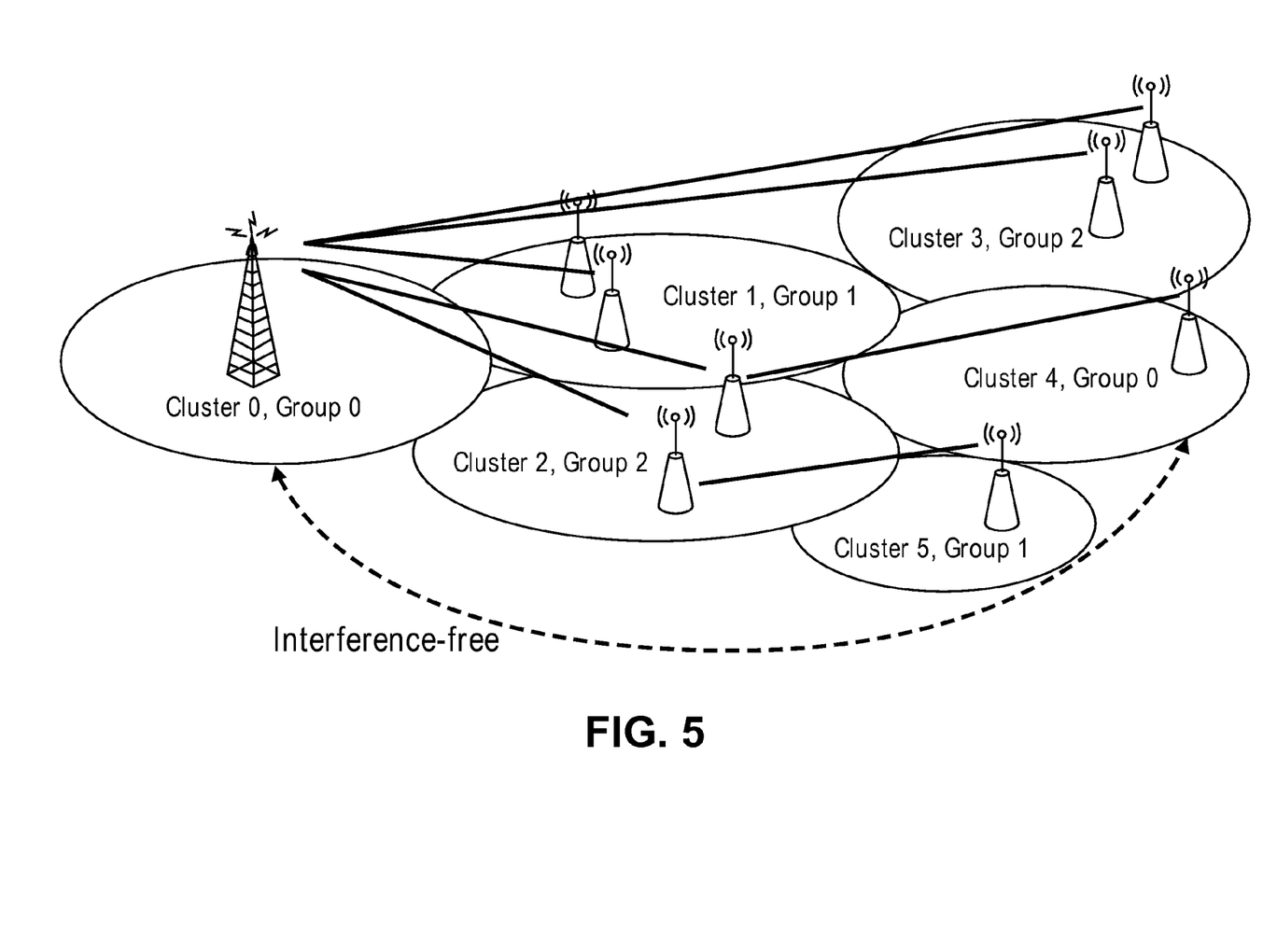
FIG. 5 is an exemplary clustering and grouping process.

If all of the stations in a network share the common resources carrying the same signals or contents, the limited bandwidth of one channel limits the amount of data that can be transferred. In other words, there is no frequency or bandwidth reuse to better utilize the available bandwidth. In one example of the present invention, the size of or the number of stations in a cluster may be reduced. Also, stations that are interference-free or that have limited signal interference among themselves may be placed in one group. FIG. 5 illustrates an example of grouping clusters or stations together according to the level of interferences among clusters or stations. In particular, two or more clusters that do not interfere or significantly interfere with each other may be grouped together in one group. Also, two or more clusters that interfere with each other may be placed in different groups.

Figure 6:
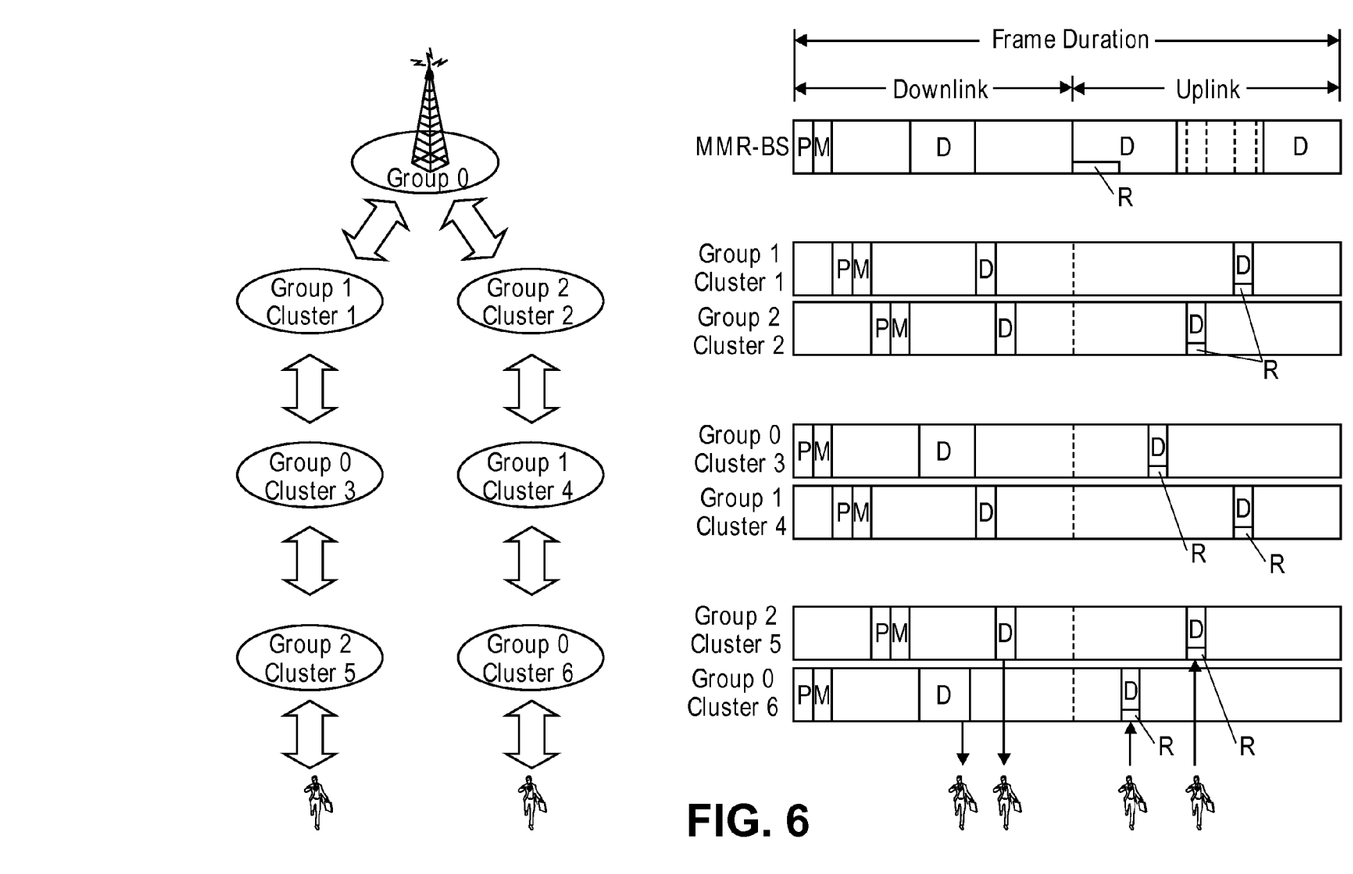
FIG. 6 is an exemplary data structure for MR-enabled mode with exemplary clustering and grouping implemented.

In one example of the invention, different clusters in the same group may transmit cluster-dependent signals, such as cluster-dependent control signals and user data, which may differ from cluster to cluster. Due to the nature of the grouping illustrated above, the cluster-dependent signals from different clusters do not or rarely interfere with each other. Therefore, more than one set of data or signals may be transmitted simultaneously to provide better bandwidth usage. FIG. 6 illustrates an exemplary data structure that can be designed based on this concept. Referring to FIG. 6, resources allocated to a group may be used independently by all other clusters in the same group. In other words, stations of different clusters but of the same group may reuse the same channel or the same bandwidth to transfer different sets of data or signals. In some examples, techniques combining clustering and grouping may reduce frequent handovers and/or improve the utilization of radio resources.

It will be appreciated by those skilled in the art that changes could be made to the examples described above without departing from the broad inventive concept thereof. It is understood, therefore, that this invention is not limited to the particular examples or embodiments disclosed, but it is intended to cover modifications within the spirit and scope of the present invention as defined by the appended claims.

The invention claimed is:

1. A wireless communication device comprising:
a first station coupled with at least one second station, the first and second stations being within a first cluster, wherein the stations within the first cluster are configured to operate cooperatively to transmit or receive signals corresponding to the cluster over at least one channel and at least one of the stations transmits only data signals without transmitting at least one of a preamble and a MAP message.

2. The device of claim 1, wherein the station comprises a relay station.

3. The device of claim 2, wherein the relay station comprises one of a transparent relay station and a non-transparent relay station.

4. The device of claim 1, wherein the station comprises a control station.

5. The device of claim 1, wherein the signals comprise at least one of a preamble, a MAP message and data.

6. The device of claim 1, wherein the stations within the first cluster transmit one set of signals.

7. The device of claim 1 further comprising a second cluster, the first cluster and the second cluster grouped into a group, wherein the stations in the group configured to avoid signal-transmission interference among the stations.

8. The device of claim 7, wherein the stations within the group transmit different sets of signals.

* * * * *